(12) United States Patent
Münch et al.

(10) Patent No.: US 11,787,723 B2
(45) Date of Patent: Oct. 17, 2023

(54) SYSTEM FOR A GLASS DRAWING PROCESS AND METHOD FOR ADJUSTING A SYSTEM FOR A GLASS DRAWING PROCESS

(71) Applicant: Schott AG, Mainz (DE)

(72) Inventors: Wolfgang Münch, Ginsheim-Gustavsburg (DE); Roland Fuchs, Mitterteich (DE); Gregor Rösel, Ginsheim-Gustavsburg (DE)

(73) Assignee: Schott AG, Mainz (DE)

( * ) Notice: Subject to any disclaimer, the term of this patent is extended or adjusted under 35 U.S.C. 154(b) by 147 days.

(21) Appl. No.: 17/333,690

(22) Filed: May 28, 2021

(65) Prior Publication Data

US 2021/0371319 A1 Dec. 2, 2021

(30) Foreign Application Priority Data

May 29, 2020 (EP) ..................................... 20177551

(51) Int. Cl.
*C03B 17/04* (2006.01)
*C03B 5/167* (2006.01)

(52) U.S. Cl.
CPC ............ *C03B 17/04* (2013.01); *C03B 5/1672* (2013.01)

(58) Field of Classification Search
CPC .................................................. C03B 17/04
See application file for complete search history.

(56) References Cited

U.S. PATENT DOCUMENTS 2,390,925 A * 12/1945 Danner ................... C03B 17/04
65/187
2,402,924 A * 6/1946 Snyder ..................... C03B 17/04
65/356
(Continued)

FOREIGN PATENT DOCUMENTS

| CN | 107848855 A | * | 3/2018 | ............. C03B 17/04 |
| DE | 10230496 C1 | * | 9/2003 | ............. C03B 17/04 |

(Continued)

OTHER PUBLICATIONS

European Communication dated Oct. 22, 2020 for European Patent Application No. 20177551.7 (4 pages).

(Continued)

*Primary Examiner* — Galen H Hauth
*Assistant Examiner* — Steven S Lee
(74) *Attorney, Agent, or Firm* — Taylor IP, P.C.

(57) ABSTRACT

A system for use in a glass drawing process includes: a tensioning element; a refractory tube having a tubular element and a surface element, the refractory tube being configured so molten glass runs onto a contact surface area of the refractory tube during a glass drawing process, the contact surface area of the refractory tube being allocated at least in part on the surface element, the surface element covering at least one surface of an end section of the tubular element, and the surface element projects at least in part over the end section of the tubular element, at least one portion of the part of the surface element projecting over the end section of the tubular element being connected at least in part to the tensioning element; and a carrier that carries the refractory tube and is connected with the refractory tube in a non-rotating manner.

20 Claims, 3 Drawing Sheets

(56) References Cited

U.S. PATENT DOCUMENTS

| | | | | |
|---|---|---|---|---|
| 2,464,028 A | * | 3/1949 | Danner | C03B 17/04 |
| | | | | 65/187 |
| 3,194,645 A | * | 7/1965 | Green | C03B 17/04 |
| | | | | 264/336 |
| 3,236,619 A | * | 2/1966 | Frye | C03B 17/04 |
| | | | | 65/184 |
| 3,360,353 A | * | 12/1967 | Torok | C03B 17/04 |
| | | | | 65/184 |
| 3,360,354 A | * | 12/1967 | Bates | C03B 17/04 |
| | | | | 65/184 |
| 8,336,336 B2 | * | 12/2012 | Singer | C03B 17/04 |
| | | | | 65/352 |
| 2016/0046517 A1 | * | 2/2016 | Kass | C03B 19/02 |
| | | | | 65/86 |
| 2018/0362382 A1 | * | 12/2018 | Hoshiba | C23C 28/321 |
| 2018/0362384 A1 | * | 12/2018 | Hoshiba | C03B 17/025 |
| 2020/0087190 A1 | * | 3/2020 | Wada | C03B 17/04 |

FOREIGN PATENT DOCUMENTS

| | | | | |
|---|---|---|---|---|
| DE | 102017210682 A1 | * | 12/2018 | C03B 17/04 |
| FR | 2130174 B1 | * | 10/1975 | C03B 17/04 |
| GB | 1008084 | | 10/1965 | |
| JP | H08165127 A | * | 6/1996 | C03B 17/04 |

OTHER PUBLICATIONS

European Office Action dated Nov. 11, 2020 for European Patent Application No. 20177551.7 (7 pages).

\* cited by examiner

SYSTEM FOR A GLASS DRAWING PROCESS AND METHOD FOR ADJUSTING A SYSTEM FOR A GLASS DRAWING PROCESS

CROSS REFERENCE TO RELATED APPLICATIONS

This application claims priority to European Patent Application No. EP 20177551.7, filed on May 29, 2020, which is incorporated in its entirety herein by reference.

BACKGROUND OF THE INVENTION

1. Field of the Invention

The present invention relates to a system which can be used in a glass drawing process. The present invention also relates to a method for adjusting a system which can be used in a glass drawing process.

2. Description of the Related Art

In the state of the art for a mechanical glass tube drawing process, such as the Danner process, a carrier is used which carries a refractory tube and both the carrier and the refractory tube are connected with each other in a non-rotating manner. The refractory tube in turn provides a contact surface area onto which molten glass runs, which molten glass then is shaped into a glass tube strand in the shaping zone provided by a head which is connected at one end of and to the refractory tube. During the drawing process, the carrier performs a rotational movement, and so does the refractory tube together with the head.

However, in conventional glass drawing processes, it has been observed that the geometric parameters, hence, the quality, of the glass tube strand can still be improved. For example, the uniformity of the thickness of the wall of the glass tube strand might be subject to improvements or at least subject to a better control.

What is needed in the art is a method which allow production of a glass tube strand of improved quality in an easy and cost-efficient manner.

SUMMARY OF THE INVENTION

In some exemplary embodiments provided according to the present invention, a system for use in a glass tube drawing process includes: a tensioning element; a refractory tube having a tubular element and a surface element, the refractory tube being configured so molten glass runs onto a contact surface area of the refractory tube during a glass drawing process, the contact surface area of the refractory tube being allocated at least in part on the surface element, the surface element covering at least one surface of an end section of the tubular element, and the surface element projects at least in part over the end section of the tubular element, at least one portion of the part of the surface element projecting over the end section of the tubular element being connected at least in part to the tensioning element; and a carrier that carries the refractory tube and is connected with the refractory tube in a non-rotating manner.

In some exemplary embodiments provided according to the present invention, a method for adjusting a system for use in a glass tube drawing process is provided. The system includes a tensioning element, a refractory tube having a tubular element and a surface element, the refractory tube being configured so molten glass runs onto a contact surface area of the refractory tube during the glass tube drawing process, the contact surface area of the refractory tube being allocated at least in part on the surface element, the surface element covering at least one surface of an end section of the tubular element, and the surface element projects at least in part over the end section of the tubular element, at least one portion of the part of the surface element projecting over the end section of the tubular element being connected at least in part to the tensioning element, and a carrier that carries the refractory tube and is connected with the refractory tube in a non-rotating manner. The method includes moving the carrier relative to the tubular element along a first axial direction for causing a synchronous movement of the tensioning element and the surface element, and for tensioning the surface element on the tubular element in at least one of an axial direction or a radial direction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
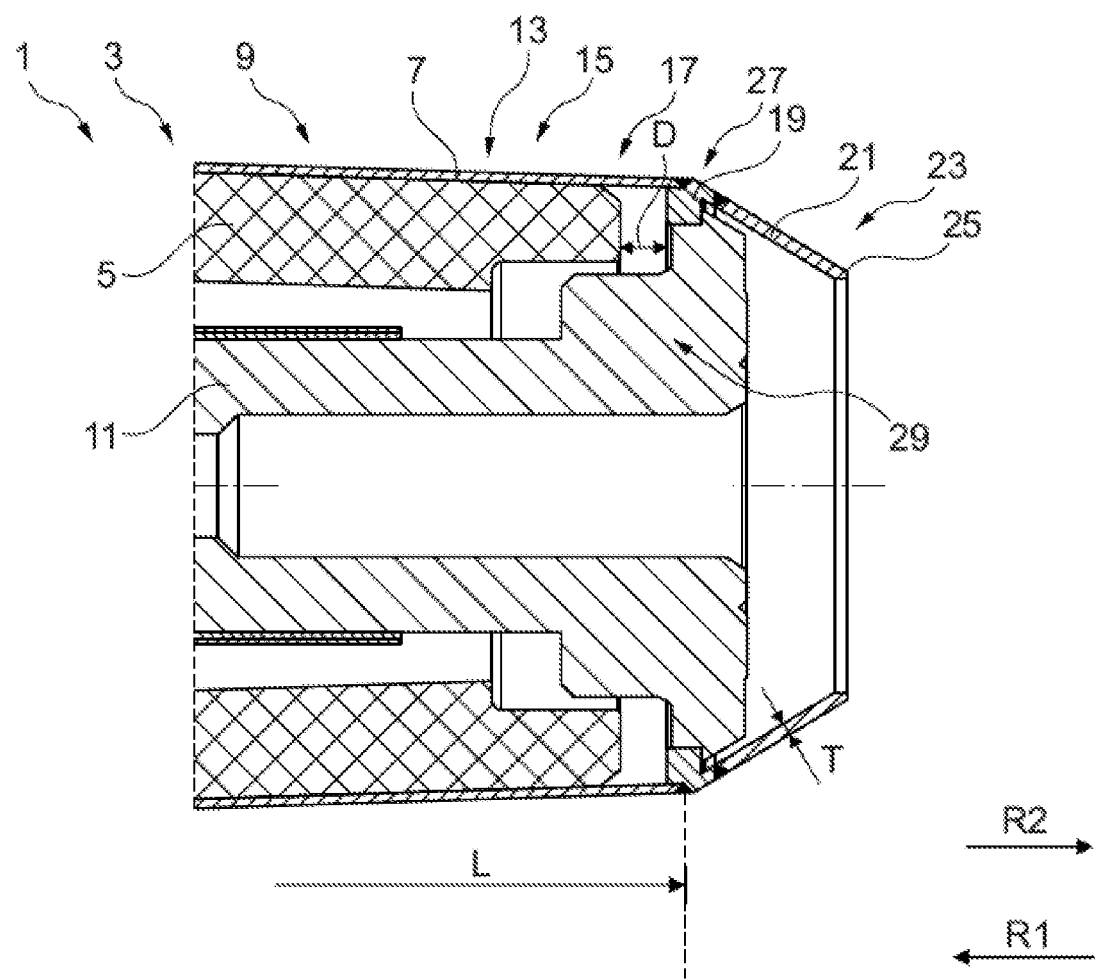
FIG. 1 illustrates an exemplary embodiment of a system provided according to the present invention.

Exemplary embodiments provided according to the present invention provide a system which can be used in a glass drawing process. The system includes: a refractory tube having a tubular element and at least one surface element, on which refractory tube during the drawing process molten glass runs onto a contact surface area of the refractory tube, and a carrier, which carries the refractory tube and which is connected with the refractory tube in a non-rotating manner. The contact surface area of the refractory tube is allocated at least in part on the surface element. The surface element covers at least one surface of an end section of the tubular element and the surface element projects at least in part over the end section of the tubular element. At least one portion of the part of the surface element projecting over the end section of the tubular element is connected at least in part to at least one tensioning element which is further comprised by the system.

Exemplary embodiments provided according to the present invention are thus based on the surprising finding that improving the accuracy of the refractory tube and improving the surface conditions of the refractory tube's surface where the molten glass is in contact with the refractory tube allows highly improving the quality of the produced glass tube strand.

It has been found that providing a continuous surface element of appropriate tension allows addressing both aspects at the same time. It has been found that the tension introduced to the surface element influences the glass tube strand in a highly positive manner. While no strict scientific theory for explaining this phenomenon has been identified, it is assumed that the introduced tension leads to a highly stable contact surface which leads to reduced disturbances of the molten glass.

Furthermore, in that the surface element projects over the end section of the tubular element, it is possible to inherently provide a precisely defined edge in the shaping zone for drawing the glass tube strand of the refractory tube, hence, rendering the previously used head obsolete. Removing the head significantly reduces the imbalances it conventionally introduced to the system. The reduced imbalances lead to an improved accuracy, which allows production of very uniform glass tube strands.

In addition, having, for example, only one single contact surface in form of the surface element without any transition areas between the refractory tube and the edge, disturbances, such as gaps, slits, particles and other disruptions, which previously affected the molten glass in respective transition areas are eliminated or reduced to a minimum.

The part of the surface element projecting over the end section of the tubular element serves a further purpose in that it is possible that the tensioning element can be connected with the surface element in a quite convenient and easy manner. Especially, the connection can be realized without the need to accommodate the tensioning element somewhere within the tubular element. Rather, the tensioning element can be provided outside the tubular element. This allows retrofitting any existing refractory tube according to the present invention. This can be done very cost-efficient.

The present invention thus provides a useful way for producing glass tube strands of high quality with only little and inexpensive modifications of conventional glass drawing systems.

The term "element A covers surface X" can be understood here that element A is arranged directly on the surface X. However, the term can also be understood to mean that, between element A and the surface X, one or more further elements or layers are arranged which are then sandwiched between element A and the surface X.

In some embodiments alternatively or in addition the axial direction refers to the direction of the main extension of the system, especially to the direction of the main extension of the refractory tube, in particular to the direction of the main extension of the tubular element.

In some embodiments, alternatively or in addition the axial direction may be parallel to the direction of the extension of the rotational axis of the system, especially of the rotational axis of the refractory tube, in particular of the rotational axis of the tubular element.

In some embodiments, it might alternatively or in addition be provided that the tensioning element is in operative connection with the carrier, such that a movement of the carrier relative to the tubular element along a first axial direction causes a synchronous movement of the tensioning element and the surface element, hence, the surface element is, can be and/or will be tensioned on the tubular element in axial and/or radial direction, and/or that the surface element and the tensioning element are designed in one piece, especially are welded.

It is astonishing that the proposed tension can be introduced to the surface element in a very easy manner by simply displacing the carrier in axial direction. This task can be accomplished even during production because no physical access to the surface element is required. Downtimes of the system are, thus, avoided. Said beneficial interplay between carrier, tensioning element and surface element is, therefore, highly appreciated.

It is particularly noted that due to the provision of a tensioned surface element, also possible changes of conditions of the environment and/or the system, such as temperature variations, do hardly affect the glass drawing process, if at all. This is because the tension on the surface element might be either kept on a constant level or otherwise adapted dependent on the given conditions by a respective axial movement of the carrier, hence, the tensioning element.

The one-piece design leads to a particularly robust design. It also allows reduction or even elimination of disturbances between the surface element and the tensioning element.

A welded connection is easy to produce, strong and durable.

In some embodiments, it might alternatively or in addition be provided that the surface element comprises at least one outer surface, which provides at least one outer surface of the system and the contact surface area of the refractory tube is allocated at least in part on the outer surface of the surface element.

The outer surface of the surface element is directly accessible as part of the outer surface of the system, hence it is highly appreciated to use this outer surface as contact surface area.

In some embodiments, it might alternatively or in addition be provided that the tensioning element follows the tubular element and/or the refractory tube along a second axial direction, especially the second axial direction is parallel or anti-parallel to the first axial direction.

This way, the tensioning element does not need to be accommodated somewhere within the refractory tube. Hence, no modifications at the refractory tube itself are required in that respect. This is highly convenient since the present invention might be applied to any existing refractory tube in an easy and cost-efficient manner.

In some embodiments, it might alternatively or in addition be provided that the tensioning element has an axial distance to the end section of the tubular element, especially a hollow space is provided between the tensioning element and the end section of the tubular element, and wherein, especially in at least one cross-sectional plane of the system, the axial distance between the tensioning element and the end section of the tubular element is between 1 and 30 mm, such as between 10 and 25 mm, between 18 and 21 mm, or 19 mm.

A respective distance allows that enough mechanical play for adjusting the tension of the surface element is available, e.g., in cases where the conditions of the environment and/or system change, hence, an adjustment of the tension, hence, axial movement of the tensioning element is possible in a safe way.

The term "mechanical play" here means that the tensioning element has some space which is available for displacing the tensioning element.

A distance of between 1 and 30 mm has been proven useful so that the axial distance is not too small and not too large, which allows a compact design of the system while still having enough play.

In some embodiments, it might alternatively or in addition be provided that (i) the part of the surface element covering the surface of the end section of the tubular element has at least in part a cylindrical shape and/or has, for example in the cross-sectional plane, an axial length of between 0.5 and 3.0 m, such as of between 0.8 and 2.8 m, of between 0.8 and 1.2 m or of between 1.6 and 2.4 m, and/or a, constant or variable, thickness of between 0.5 and 4.0 mm, such as of between 0.7 and 1.5 mm or of between 0.9 and 1.1 mm, (ii) the part of the surface element projecting over the end section of the tubular element has at least in part a conical shape and/or has, such as in the cross-sectional plane, an axial length of between 1 and 50 mm, such as of between 10 and 50 mm or of between 10 and 30 mm, and/or a, constant or variable, thickness of between 0.5 to 5 mm, such as of between 1.0 and 3.0 mm or of between 2.0 and 3.0 mm, and/or (iii) the surface element has, such as in the cross-sectional plane, an axial length of between 0.5 and 5.0 m, such as of between 1.0 and 3.5 m or of between 1.0 and 3.0 m.

A cylindrical shape of the part of the surface element covering the surface of the end section of the tubular element allows covering the (for example also cylindrical shaped tubular element) in a particularly easy and convenient manner. The thickness can be important for obtaining desired glass tube strand parameters.

A conical shape of the part of the surface element projecting over the end section of the tubular element can allow providing a shaping zone in a desired manner. This is because this way the transition of the molten glass running on the refractory tube to a free running glass tube strand can be designed in a smooth manner. The desired length and thickness of that part of the surface element takes positive influence of the glass tube strand parameters.

A surface element of sufficient axial length allows ensuring that the molten glass has predominant contact with the tensioned surface element.

In the present application, the term "element E has a constant thickness of between X and Y" means that the thickness of element E along at least one direction, such as an axial direction, might take a specific value of the interval between X and Y. For example, if element E has a constant thickness of between 1 cm and 2 cm, the thickness of element E might be 1.5 cm, e.g. along the axial direction.

In the present application, the term "element E has a variable thickness of between X and Y" means that the thickness of element E along at least one direction, such as an axial direction, might gradually and/or in one or more steps change from a start value to a stop value, wherein the start value and the stop value both are between X and Y. The start and stop values might correspond to the two borders of the interval, X and Y. However, this is not necessary. For example, if element E has a variable thickness of between 1 cm and 2 cm, the thickness of element E might change gradually from 1 cm to 2 cm, e.g. along the axial direction. Likewise, the thickness of element E might also change gradually only from 1.1 cm to 1.9 cm, e.g. along the axial direction. Likewise, the thickness of element E might also change step-like (in one or more steps) from 1 cm to 2 cm, e.g. along the axial direction. Likewise, the thickness of element E might also change step-like (in one or more steps) from 1.4 cm to 1.5 cm, e.g. along the axial direction.

In some embodiments, it might alternatively or in addition be provided that the system further comprises at least one front element, especially of at least in part conically shape, which front element is connected with the tensioning element, especially both are designed in one piece, such as welded, and wherein at least one outer surface of the front element, especially of the cone, provides at least one outer surface of the system.

The front element allows improving the transition of the glass tube strand to a free running glass tube strand. This is particularly the case if the front element is of conical shape. Hence, the glass shaping process is supported.

The front element can be connected in a safe manner to the tensioning element. This is beneficial because this way the front element always moves along with the tensioning element when the carrier is moved along the axial direction for the purpose of tensioning the surface element. Hence, no further separate adjustments of the front element are required.

If the outer surface of the system is allocated on (parts of) the outer surface of the front element, it is possible that the front element can get in contact with the molten or already more viscous glass and support the shaping process.

In some embodiments, it might alternatively or in addition be provided that the cone of the front element has at least one maximal diameter of between 200 and 280 mm, such as of between 220 and 250 mm, and/or has at least one minimal diameter of between 140 and 180 mm, such as of between 155 and 170 mm; and/or that, especially in the cross-sectional plane, the front element, such as the cone, has an axial length of between 10 and 100 mm, such as of between X and Y mm, and/or has a, constant or variable, thickness of between 2 and 10 mm, such as of between 3 and 8 mm, 4-6 mm, or of 5 mm.

The dimensions and the design of the cone are inter alia responsible for determining the glass tube strand parameters, such as diameter and wall thickness. Hence, choosing appropriate values can lead to desired glass tube strand geometries.

The exemplary thickness has a positive influence on the symmetry of the glass tube strand and also on its wall thickness.

In some embodiments, it might alternatively or in addition be provided that especially in the cross-sectional plane, the front element has at least one edge, the edge may face away from the end section of the tubular element, and at least one tangent of the edge encloses with the outer surface of the front element, especially at least one normal vector thereof, at least one angle of between 30 and 80 degrees; and/or that the front element follows the tensioning element along the second axial direction, especially the front element is arranged at the side of the tensioning element facing away from the end section of the tubular element.

Providing a well-defined edge improves the quality of the glass tube strand in a significant manner. This is all the more the case if not only the surface element but also the front element is the final element contacting the molten or already more viscous glass in the shaping zone.

The respective arrangement allows a process so that the molten glass contacts first the surface element and subsequently the front element when the glass is already more viscous. Of course, prior to and subsequent to contacting the front element the glass might have contact to other elements of the system as well, if desired and/or appropriate.

In some embodiments, it might alternatively or in addition be provided that the front element comprises and/or is designed in the form of at least one metal sheet; and/or that the front element and the surface element encloses at least one angle of between 90 and 170 degrees, such as of between 100 and 150 degrees, especially the angle is between the normal vectors of the outer surfaces of the front element and the surface element.

A metal sheet allows providing a front element in many different shapes. Furthermore, a metal sheet can be produced in a very thin but still stable manner. This significantly improves the quality of the glass tube strand. Furthermore, imbalances are avoided.

Appropriately chosen parameters of the individual elements allow a glass tube drawing process to obtain a glass tube strand of particularly high quality.

In some embodiments, it might alternatively or in addition be provided that at least one outer surface of the tensioning element provides at least one outer surface of the system, especially having a ring-like shape and/or arranged between the outer surfaces of the surface element and the front element, such as the outer surface of the tensioning element provides together with the outer surface of the surface element and/or with the outer surface of the front element at least area by area a seamless area of the outer surface of the system.

If the tensioning element provides an outer surface of the system, the glass tube drawing process can be conducted in a more defined manner. This is inter alia because then the tensioning element not only provides tension to the surface element but also serves the purpose of guiding the glass towards the shaping zone.

If the outer surfaces of two or more, such as of all three, of the tensioning element, surface element and front element provide a seamless area of the outer surface of the system, the transition between the individual elements is free of disruptions so that the glass material is not adversely affected. This leads to particularly high quality glass tube strands.

In some embodiments, it might alternatively or in addition be provided that the tensioning element is connected directly or indirectly with the carrier via at least one intermediate element, wherein the intermediate element is built in one piece, especially welded, with the carrier and/or the tensioning element, wherein the intermediate element comprises at least two intermediate part elements, and one of the intermediate part elements is connected with the carrier, especially designed in one piece such as welded, and/or the other one is connected with the tensioning element, especially designed in one piece such as welded, wherein each of the intermediate part elements provides at least one contact surface, such as a wedge-shaped contact surface, and the two intermediate part elements are arranged such that their contact surfaces, especially their wedge-shaped contact surfaces, contact each other at least in part.

An intermediate element can be easily provided and allows a secure connection with the tensioning element, hence, a precise control over the tensioning element. This is important because the tensioning element is responsible for introducing the tension to the surface element.

A one-piece design is particularly safe and easy to provide.

Separating the intermediate element in two or even more intermediate part elements allows a convenient installation of the intermediate element.

A wedge-shape allows transferring an axial movement of the carrier to the tensioning element in an efficient manner.

In some embodiments, it might alternatively or in addition be provided that the material of (i) the surface element comprises at least one noble metal, especially platinum or a platinum alloy, the platinum alloy comprising 0-5 mol % of Ir and 0-30 mol % of Rh, (ii) the tensioning element comprises nickel based alloy and/or at least one noble metal, especially platinum, (iii) the refractory tube comprises ceramic comprising magnesium spinel, (iv) the carrier comprises steel, especially steel comprising: 24-26% by weight of Cr, 8-11% by weight of Fe, 2% by weight of Al and 55-66% by weight of Ni, (v) the intermediate element comprises steel, especially steel comprising: 24-26% by weight of Cr, 8-11% by weight of Fe, 2% by weight of Al and 55-66% by weight of Ni, and/or at least one noble metal, especially platinum, and/or (vi) the front element comprises at least one noble metal, especially platinum.

The choice of a material can lead to an improved heat resistance of the system and to improved quality of the glass tube strand.

It is particularly noted that if the surface element is made of noble metals such as platinum or a platinum alloy, the first contact of the molten glass with the refractory tube is a contact of the glass material with said noble metal. This may be desired because an early contact of the glass material with materials other than noble metals might lead to contaminations of the glass tube strand due to their lower heat resistance.

In some embodiments, it might alternatively or in addition be provided that the tubular element has an axial length of between 0.5 and 5.0 m, such as of between 1.0 and 3.5 m or of between 2.0 and 3.0 m, and/or that the surface element, especially the outer surface thereof, has a mean roughness RZ of 4 nm and/or is polished.

A tubular element of appropriate length leads to an improved process of cooling of the glass material while it is running on the refractory tube. Especially, this allows at least in part and in principle control of the time the glass material is in contact with the refractory tube.

In some exemplary embodiments provided according to the present invention, a method for adjusting a system which can be used in a glass tube drawing process is provided. The system comprising the previously described system. The method includes:

providing a respective system; and moving the carrier relative to the tubular element along a first axial direction for causing a synchronous movement of the tensioning element and the surface element, and for tensioning the surface element on the tubular element in axial and/or radial direction.

Exemplary embodiments provided according to the present invention are thus based on the surprising finding that the system can be adjusted in a highly convenient manner, even without interrupting the production process. This is possible because only the carrier has to be moved along an axial direction. With the carrier also the tensioning element performs a respective movement. Due to the connection between the tensioning element and the surface element, the tension is easily introduced to the surface element.

It is particularly noted, that such an adjustment in principle can be carried out in an automated manner. This, for example, makes it possible, e.g., within a feedback loop, to adjust the tension dependent on certain conditions of the system and/or the environment, such as the temperature of the refractory tube. This allows producing a glass tube strand of constant high quality.

Referring now to the drawings, FIG. 1 shows an exemplary embodiment of a system 1 provided according to the present invention.

The system 1 can be used in a glass drawing process.

The system 1 comprises a refractory tube 3 having a tubular element 5 and at least one surface element 7. During the drawing process, molten glass runs on the refractory tube 3 onto a contact surface area 9 of the refractory tube 3.

The system 1 further comprises a carrier 11, which carries the refractory tube 3 and which is connected with the refractory tube 3 in a non-rotating manner.

The surface element 7 comprises at least one outer surface 13, which provides at least one outer surface of the system 1 and wherein the contact surface area 9 of the refractory tube 3 is (not only in part but completely) allocated on the outer surface 13 of the surface element 7.

The surface element 7 covers at least one surface of an end section 15 of the tubular element 5. (But it might in addition also cover a surface of e.g., a middle section of the tubular element 5 in some embodiments.) The surface element 7 projects at least in part over the end section 15 of the tubular element 5.

The part 17 of the surface element 7 projecting over the end section 15 of the tubular element 5 is connected with a tensioning element 19 which is further comprised by the system 1.

The tensioning element 19 is in operative connection with the carrier 11 such that a movement of the carrier 11 relative to the tubular element 5 along a first axial direction R1 causes a synchronous movement of the tensioning element 19 and the surface element 7, hence, the surface element 7 is, can be and/or will be tensioned on the tubular element 5 in axial direction (such as the first axial direction R1) and/or radial direction.

The tensioning element 19 follows the tubular element 5 along a second axial direction R2, wherein the second axial direction R2 is anti-parallel to the first axial direction R1.

The surface element 7 and the tensioning element 19 are designed in one piece in that they are welded.

The tensioning element 19 has an axial distance D to the end section 15 of the tubular element 5. Indeed, a hollow space is provided between the tensioning element 19 and the end section 15 of the tubular element 5. Just as an example, in the cross-sectional plane of the system 1 in FIG. 1, the axial distance D between the tensioning element 19 and the end section 15 of the tubular element 5 might be 19 mm, which, however, might also be subject to variation dependent on the conditions of the environment and/or of the system 1.

The part of the surface element 7 covering the surface of the end section 15 of the tubular element 5 has at least in part a cylindrical shape. The part 17 of the surface element 7 projecting over the end section 15 of the tubular element has at least in part a conical shape. The surface element 7 has in the cross-sectional plane of FIG. 1 an axial length L of 2.0 m (however, not the entire axial length is visible in FIG. 1).

The system 1 further comprises a front element 21 of conically shape. The front element 21 is connected with the tensioning element 19. To be more precise, both are designed in one piece in that they are welded. The outer surface 23 of the front element 21, provides at least one outer surface of the system 1. The front element 21 has an edge 25 which faces away from the end section 15 of the tubular element 5. The front element 21 follows the tensioning element 19 along the second axial direction R2. To be more precise, the front element 21 is arranged at the side of the tensioning element 19 facing away from the end section 15 of the tubular element 5.

The front element 21 has in the cross-sectional plane of FIG. 1 a thickness T of, for example, 5 mm.

It is appreciated that the outer surface 27 of the tensioning element 19 provides at least one outer surface of the system 1, wherein the outer surface 27 has a ring-like shape and is arranged between the outer surfaces 13 and 23 of, respectively, the surface element 7 and the front element 21. Particularly, the outer surface 27 of the tensioning element 19 provides together with the outer surface 13 of the surface element 7 and with the outer surface 23 of the front element 21 a seamless area of the outer surface of the system 1.

Thus, the glass material is not affected by disruptions due to the surface area of system 1 with which it gets in contact.

It is noted that the tensioning element 19 is connected indirectly with the carrier 11 via an intermediate element 29. Indeed, the intermediate element 29 is built in one piece with the carrier 11.

Once a system which can be used in a glass tube drawing process, such as system 1 described previously, is provided, a method for adjusting the system (e.g. system 1) might be carried out on that system. This method comprises moving the carrier (e.g. carrier 11) relative to the tubular element (e.g. tubular element 5) along a first axial direction (e.g. axial direction R1) for causing a synchronous movement of the tensioning element (e.g. tensioning element 17) and the surface element (e.g. surface element 7) and for tensioning the surface element on the tubular element in axial and/or radial direction.

Figure 2:
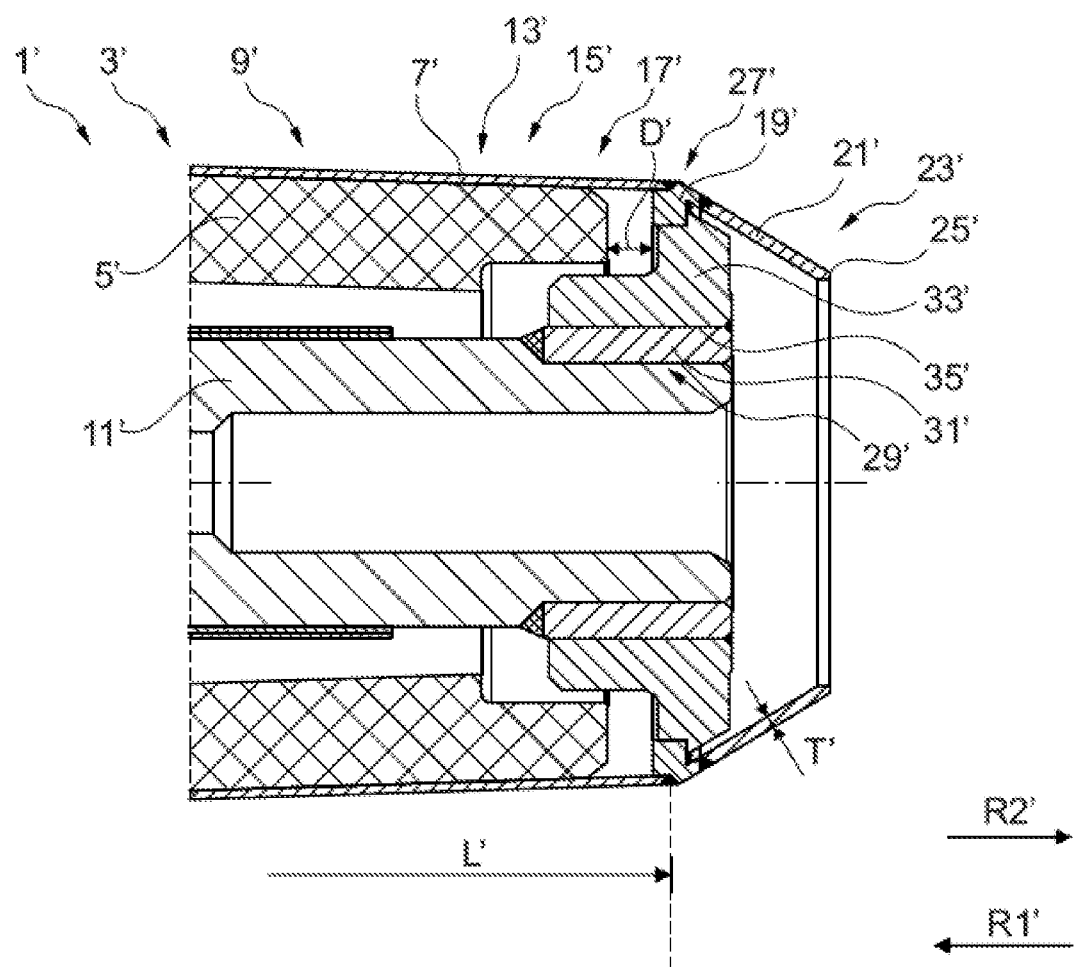
FIG. 2 illustrates another exemplary embodiment of a system provided according to the present invention.

FIG. 2 shows another exemplary embodiment of a system 1' provided according to the present invention.

Indeed, system 1' is similar to system 1 described previously with respect to FIG. 1. Hence, for the same structural features the same reference numerals are used, however, single apostrophed. It is, therefore, also sufficient to describe only the differences between system 1' and system 1 while for the remainder reference can be made to the description provided previously with respect to system 1 in combination with FIG. 1.

The intermediate element 29' here comprises two intermediate part elements 31' and 33', and one of the intermediate part elements (i.e. intermediate part element 31') is connected with the carrier 11', or to be more precise they are designed in one piece in that they are welded, and the other one (i.e. intermediate part element 33') is connected with the tensioning element 17'.

Each of the intermediate part elements 31', 33' provides a contact surface 35' and the two intermediate part elements 31', 33' are arranged such that their contact surfaces 35' contact each other.

Figure 3:
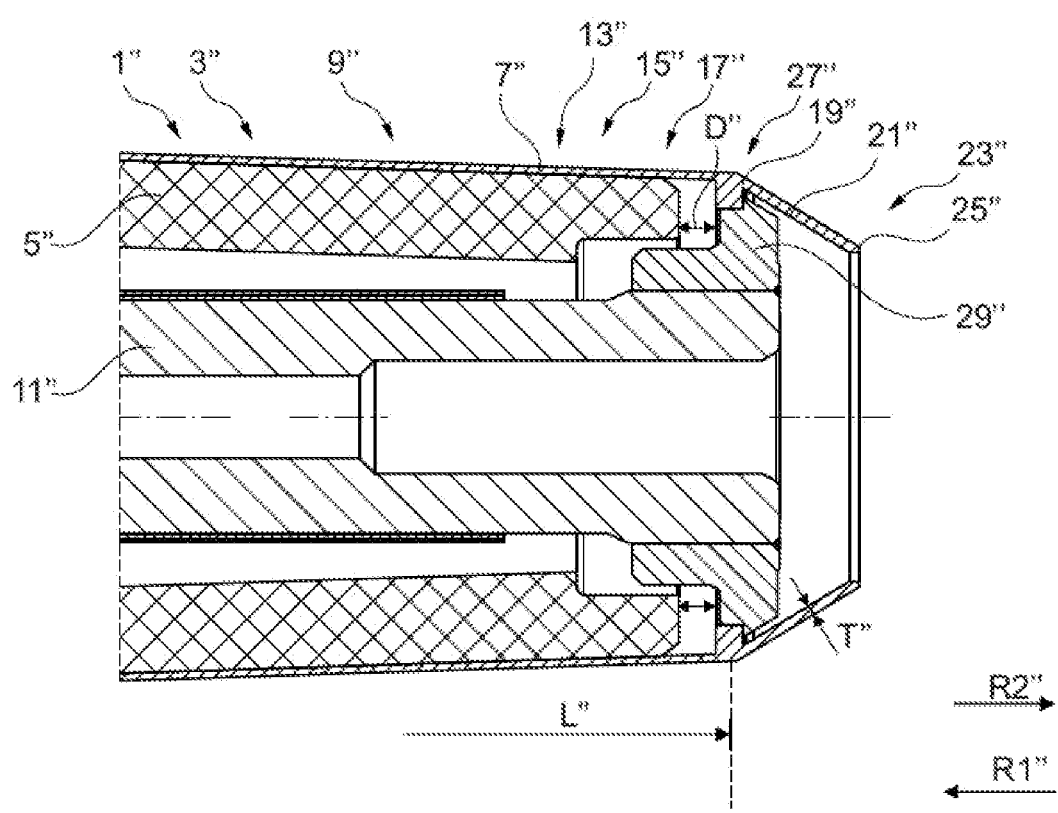
FIG. 3 illustrates another exemplary embodiment of a system provided according to the present invention.

FIG. 3 shows another exemplary embodiment of a system 1" provided according to the present invention.

Indeed, system 1" is similar to system 1 described previously with respect to FIG. 1 and to system 1' described previously with respect to FIG. 2. Hence, for the same structural features the same reference numerals are used, however, doubled apostrophed. It is, therefore, also sufficient to describe only the differences between system 1" and system 1 and system 1' while for the remainder reference can be made to the description provided previously with respect to system 1 in combination with FIG. 1 and to system 1' in combination with FIG. 2.

In system 1", the surface element 7", the tensioning element 19" and the front element 21" are all designed in one piece without being welded. This allows that the outer surface 27" of the tensioning element 19" provides together with the outer surface 13" of the surface element 7" and with the outer surface 23" of the front element 21" a seamless area of the outer surface of the system 1" in a particular easy manner.

Furthermore, in system 1" the tensioning element 19" is connected indirectly with the carrier 11" via an intermediate element 29". There are no intermediate part elements in system 1".

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 1, 1', 1" System
3, 3', 3" Refractory tube
5, 5', 5" Tubular element
7, 7', 7" Surface element
9, 9', 9" Contact surface area
11, 11', 11" Carrier
13, 13', 13" Outer surface
15, 15', 15" End section
17, 17', 17" Part
19, 19', 19" Tensioning element
21, 21', 21" Front element
23, 23', 23" Outer surface
25, 25', 25" Edge
27, 27', 27" Outer surface
29, 29', 29" Intermediate element
31' Intermediate part element
33' Intermediate part element
35' Contact surface
D, D', D" Distance
L, L' L" Length
R1, R1', R1" Direction
R2, R2', R2" Direction
T, T', T" Thickness

What is claimed is:

1. A system for use in a glass tube drawing process, the system comprising: a tensioning element; a refractory tube having a tubular element and a surface element, the refractory tube being configured so molten glass runs onto a contact surface area of the refractory tube during a glass drawing process, the contact surface area of the refractory tube being allocated at least in part on the surface element, the surface element covering at least one surface of an end section of the tubular element, and the surface element projects at least in part over the end section of the tubular element, at least one portion of the part of the surface element projecting over the end section of the tubular element being connected at least in part to the tensioning element; and a carrier that carries the refractory tube and is connected with the refractory tube in a non-rotating manner, wherein the tensioning element is in operative connection with the carrier such that a movement of the carrier relative to the tubular element along a first axial direction causes a synchronous movement of the tensioning element and the surface element, hence, the surface element is tensioned on the tubular element in at least one of an axial direction or a radial direction.

2. The system of claim 1, wherein the tensioning element follows at least one of the tubular element or the refractory tube along a second axial direction.

3. The system of claim 2, wherein the second axial direction is parallel or anti-parallel to the first axial direction.

4. The system of claim 1, wherein the surface element and the tensioning element are designed in one piece.

5. The system of claim 4, wherein the surface element and the tensioning element are welded together.

6. The system of claim 1, wherein the surface element comprises an outer surface, which provides at least one outer surface of the system.

7. The system of claim 6, wherein the contact surface area of the refractory tube is allocated at least in part on the outer surface.

8. The system of claim 1, wherein the tensioning element has an axial distance to the end section of the tubular element, a hollow space is provided between the tensioning element and the end section of the tubular element, and the axial distance between the tensioning element and the end section of the tubular element is between 1 and 30 mm in at least one cross-sectional plane of the system.

9. The system of claim 1, wherein at least one of the following is fulfilled:
  (i) the part of the surface element covering the surface of the end section of the tubular element at least one of has at least in part a cylindrical shape, has an axial length of between 0.5 and 3.0 m or has a thickness of between 0.5 and 4.0 mm;
  (ii) the part of the surface element projecting over the end section of the tubular element at least one of has at least in part a conical shape, has an axial length of between 1 and 50 mm, or has a thickness of between 0.5 to 5 mm; or
  (iii) the surface element has, in a cross-sectional plane, an axial length of between 0.5 and 5.0 m.

10. The system of claim 1, further comprising a front element which is connected with the tensioning element, wherein an outer surface of the front element provides at least one outer surface of the system.

11. The system of claim 10, wherein at least one of the following is fulfilled:
  the front element is at least in part conically shaped and a cone of the front element at least one of has at least one maximal diameter of between 200 and 280 mm or has at least one minimal diameter of between 140 and 180 mm; or
  the front element at least one of has an axial length of between 10 and 100 mm or has a thickness of between 2 and 10 mm.

12. The system of claim 10, wherein at least one of the following is fulfilled:
  the front element has an edge, the edge faces away from the end section of the tubular element, and a tangent of the edge encloses with the outer surface of the front element an angle of between 30 and 80 degrees; or
  the front element follows the tensioning element along a second axial direction and the front element is arranged at a side of the tensioning element facing away from the end section of the tubular element.

13. The system of claim 10, wherein at least one of the following is fulfilled:
  the front element at least one of comprises or is designed in the form of a metal sheet; or
  the front element and the surface element enclose an angle of between 90 and 170 degrees.

14. The system of claim 10, wherein an outer surface of the tensioning element provides at least one outer surface of the system, the outer surface of the tensioning element at least one of having a ring-like shape or being arranged between an outer surface of the surface element and the outer surface of the front element.

15. The system of claim 1, wherein the tensioning element is connected directly or indirectly with the carrier via an intermediate element.

16. The system of claim 10, wherein the front element and the tensioning element are designed in one piece.

17. The system of claim 15, wherein at least one of the following is fulfilled:
  the intermediate element is built in one piece with at least one of the carrier or the tensioning element; or the intermediate element comprises at least two intermediate part elements and one of the intermediate part elements is connected with the carrier and the other intermediate part element is connected with the tensioning element, each of the intermediate part elements providing a contact surface and the two intermediate part elements are arranged such that their contact surfaces contact each other at least in part.

18. The system of claim 15, wherein at least one of the following is fulfilled:
   (i) a material of the surface element comprises a noble metal;
   (ii) a material of the tensioning element comprises at least one of a nickel based alloy or a noble metal;
   (iii) a material of the refractory tube comprises ceramic comprising magnesium spinel;
   (iv) a material of the carrier comprises steel;
   (v) a material of the intermediate element comprises at least one of steel or a noble metal; or
   (vi) the system further comprises a front element which is connected with the tensioning element, wherein an outer surface of the front element provides at least one outer surface of the system, a material of the front element comprising a noble metal.

19. The system of claim 1, wherein at least one of the following is fulfilled:
   the tubular element has an axial length of between 0.5 and 5.0 m; or
   the surface element at least one of has a mean roughness Rz of 4 nm or is polished.

20. A method for adjusting a system for use in a glass tube drawing process, the system comprising a tensioning element, a refractory tube having a tubular element and a surface element, the refractory tube being configured so molten glass runs onto a contact surface area of the refractory tube during the glass tube drawing process, the contact surface area of the refractory tube being allocated at least in part on the surface element, the surface element covering at least one surface of an end section of the tubular element, and the surface element projects at least in part over the end section of the tubular element, at least one portion of the part of the surface element projecting over the end section of the tubular element being connected at least in part to the tensioning element, and a carrier that carries the refractory tube and is connected with the refractory tube in a non-rotating manner, the method comprising:
   moving the carrier relative to the tubular element along a first axial direction for causing a synchronous movement of the tensioning element and the surface element, and for tensioning the surface element on the tubular element in at least one of an axial direction or a radial direction.

* * * * *